(12) United States Patent
Bajwa et al.

(10) Patent No.: US 8,320,489 B2
(45) Date of Patent: Nov. 27, 2012

(54) DETERMINING CHANNEL COEFFICIENTS IN A MULTIPATH CHANNEL

(75) Inventors: Waheed Uz Zaman Bajwa, Madison, WI (US); Akbar Muhammad Sayeed, Madison, WI (US); Robert David Nowak, Madison, WI (US); Jarvis Haupt, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 952 days.

(21) Appl. No.: 12/390,323

(22) Filed: Feb. 20, 2009

(65) Prior Publication Data

US 2010/0215081 A1    Aug. 26, 2010

(51) Int. Cl.
*H04B 7/02*    (2006.01)

(52) U.S. Cl. ........ 375/267; 375/260; 375/259; 375/148; 375/144; 375/147; 375/349; 370/342; 370/320; 370/355; 370/441

(58) Field of Classification Search .................. 375/267, 375/260, 259, 148, 144, 147, 349; 370/342, 370/320, 335, 441
See application file for complete search history.

(56) References Cited

U.S. PATENT DOCUMENTS

| 7,271,747 | B2 | 9/2007 | Baraniuk et al. | |
| 7,289,049 | B1 | 10/2007 | Fudge et al. | |
| 2003/0128745 | A1* | 7/2003 | Sourour et al. | 375/147 |
| 2009/0222226 | A1* | 9/2009 | Baraniuk et al. | 702/66 |

OTHER PUBLICATIONS

Bajwa, Waheed U., et al., "Sparse Multipath Channels: Modeling and Estimation," Proceedings: 13th IEEE Digital Signal Processing Workshop, Marco Island, Florida, Jan. 4-7, 2001, 6 pages.
Bajwa, Waheed U., et al., "Compressed Sensing of Wireless Channels in Time, Frequency and Space," Proceedings: 42nd Asilomar Conference on Signals, Systems and Computers, Pacific Grove, California, Oct. 26-29, 2008, 5 pages.
Bajwa, Waheed U., et al., "Learning Sparse Doubly-Selective Channels," Proceedings: Annual Allerton Conference on Communication, Control and Computing, Monticello, Illinois, Sep. 23-26, 2008, 8 pages.
Bajwa, Waheed U., et al., "Compressed Channel Sensing," Proceedings: 42nd Annual Conference on Information Sciences and Systems, Princeton, New Jersey, Mar. 19-21, 2008, 6 pages.
Yan, Z., et al., "Experimental Study of MIMO Channel Statistics and Capacity via the Virtual Channel Representation," Tech. Rep., University of Wisconsin-Madison, Feb. 2007, 19 pages.
Taubock, G., et al., "A Compressed Sensing Technique for OFDM Channel Estimation in Mobile Environments: Exploiting Channel Sparsity for Reducing Pilots," Proceedings: ICASSP, Mar.-Apr. 2008, 4 pages.

(Continued)

*Primary Examiner* — Zewdu Kassa
(74) *Attorney, Agent, or Firm* — Bell & Manning, LLC

(57) ABSTRACT

A device, method, and computer-readable medium are provided. The device includes, but is not limited to, an antenna configured to receive a multipath signal and a processor operably coupled to the antenna to receive the multipath signal. The processor is configured to determine a training signal transmitted from a second device to create the received multipath signal; sample the received multipath signal; and determine channel coefficients based on the sampled multipath signal and the determined training signal using a mixed-norm convex optimization process, wherein the channel coefficients characterize a channel associated with the multipath signal.

20 Claims, 7 Drawing Sheets

OTHER PUBLICATIONS

Candes, E.J., et al., "The Dantzig Selector: Statistical Estimation when $p$ is Much Larger than $n$," The Annals of Statistics, vol. 35, No. 6, pp. 2313-2351, Dec. 2007.

Bajwa, Waheed U., et al., "Learning Sparse Doubly-Selective Channels," Proceedings: Annual AllertonConference on Communication, Control and Computing, Monticello, Illinois, Sep. 24, 2008, 4 pages. PowerPoint Presentation.

Bajwa, Waheed U., et al., "Compressed Sensing of Wireless Channels in Time, Frequency and Space,"Proceedings: $42^{nd}$ Asilomar Conference on Signals, Systems and Computers, Pacific Grove, California, Oct. 26-29, 2008, 20 pages. PowerPoint Presentation.

* cited by examiner

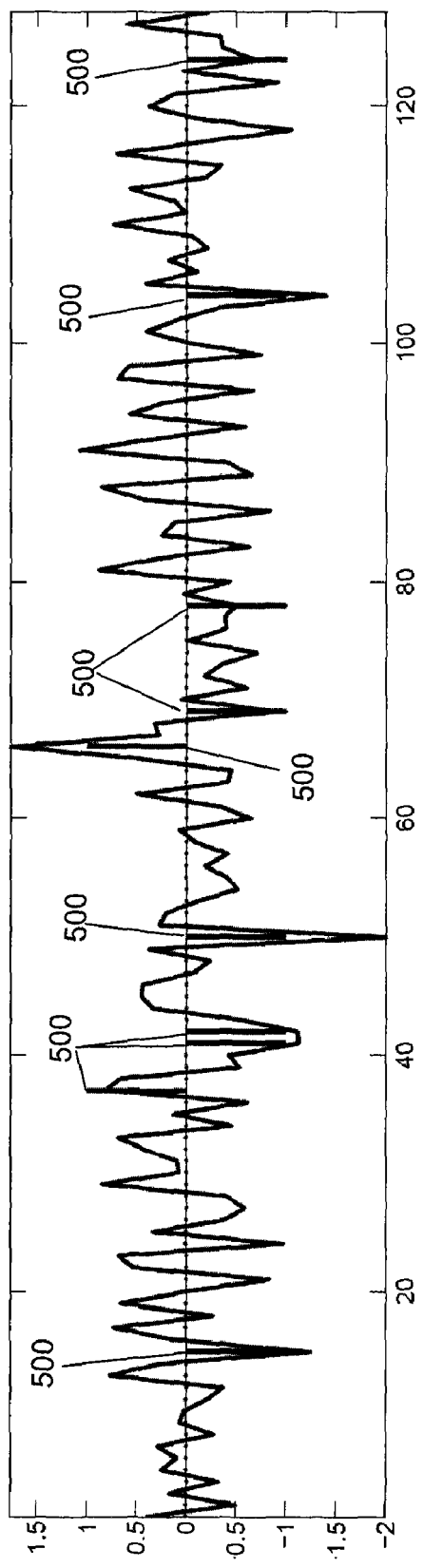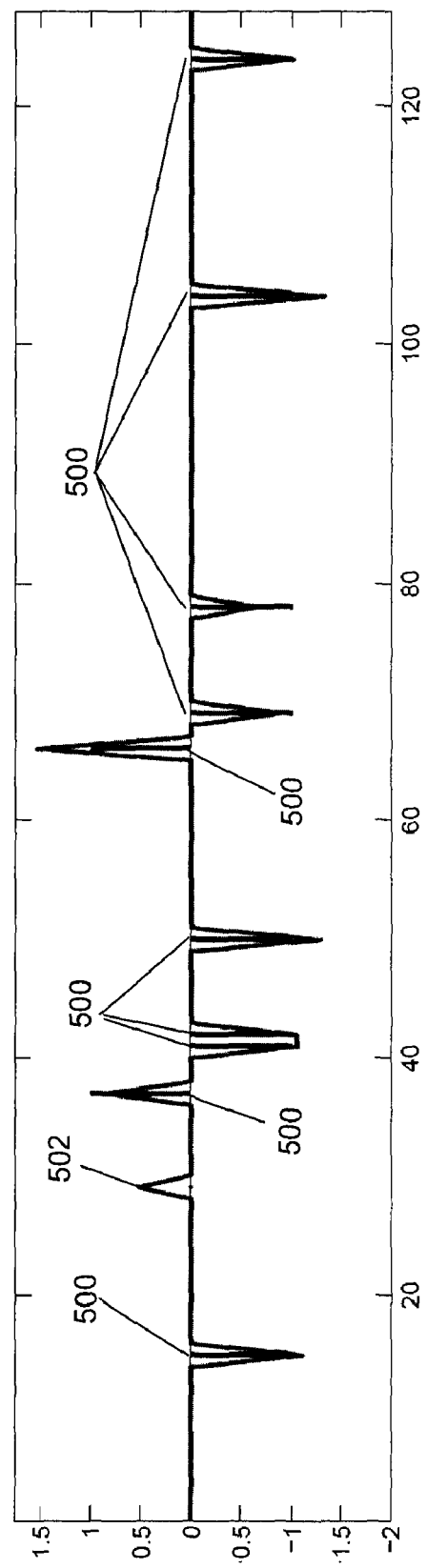
Fig. 5a
Fig. 5b

DETERMINING CHANNEL COEFFICIENTS IN A MULTIPATH CHANNEL

REFERENCE TO GOVERNMENT RIGHTS

This invention was made with United States government support awarded by the following agencies: Navy/ONR N00014-06-1-1123. The United States government has certain rights in this invention.

BACKGROUND

Knowledge of channel state information (CSI) at a transmitter and/or a receiver can have a dramatic impact on communication over multipath channels in terms of power and spectral efficiency. In particular, coherent communication is generally far more efficient than non-coherent communication, but requires that the CSI be known at the receiver to maintain coherence. Training-based schemes, which involve probing the channel with known signaling waveforms and linear processing of the corresponding channel output, are commonly used to learn the CSI at the receiver. Recent measurement studies have shown that physical multipath channels tend to exhibit an approximately sparse multipath structure at high signal space dimension—time-bandwidth-antenna product. The CSI for such channels is characterized with significantly fewer dominant parameters compared to the maximum number dictated by the delay-Doppler-angle spread of the channel. Conventional training-based methods, often based on exhaustive probing coupled with a linear least squares approach or a non-linear parametric estimator, are ill-suited for exploiting the inherently low-dimensional nature of sparse or approximately sparse multipath channels.

SUMMARY

In an illustrative embodiment, a device is provided that includes, but is not limited to, an antenna configured to receive a multipath signal and a processor operably coupled to the antenna to receive the multipath signal. The processor is configured to determine a training signal transmitted from a second device to create the received multipath signal, sample the received multipath signal, and determine channel coefficients based on the sampled multipath signal and the determined training signal using a mixed-norm convex optimization process, wherein the channel coefficients characterize a channel associated with the multipath signal.

In another illustrative embodiment, a method of determining channel coefficients characterizing a channel associated with a multipath signal is provided. A multipath signal is received at a first device. Using a processor at the first device, a training signal transmitted from a second device to create the received multipath signal is determined, the received multipath signal is sampled, and the channel coefficients are determined based on the sampled multipath signal and the determined training signal using a mixed-norm convex optimization process.

In yet another illustrative embodiment, a computer-readable medium is provided. The computer-readable medium has computer-readable instructions stored thereon which, when executed by a processor, cause a device to perform the operations of the method of determining channel coefficients characterizing a channel associated with a multipath signal.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 5a shows example results derived using a least squares estimation method in accordance with an illustrative embodiment.

FIG. 5b shows example results derived using a lasso estimation method in accordance with an illustrative embodiment.

DETAILED DESCRIPTION

Figure 1:
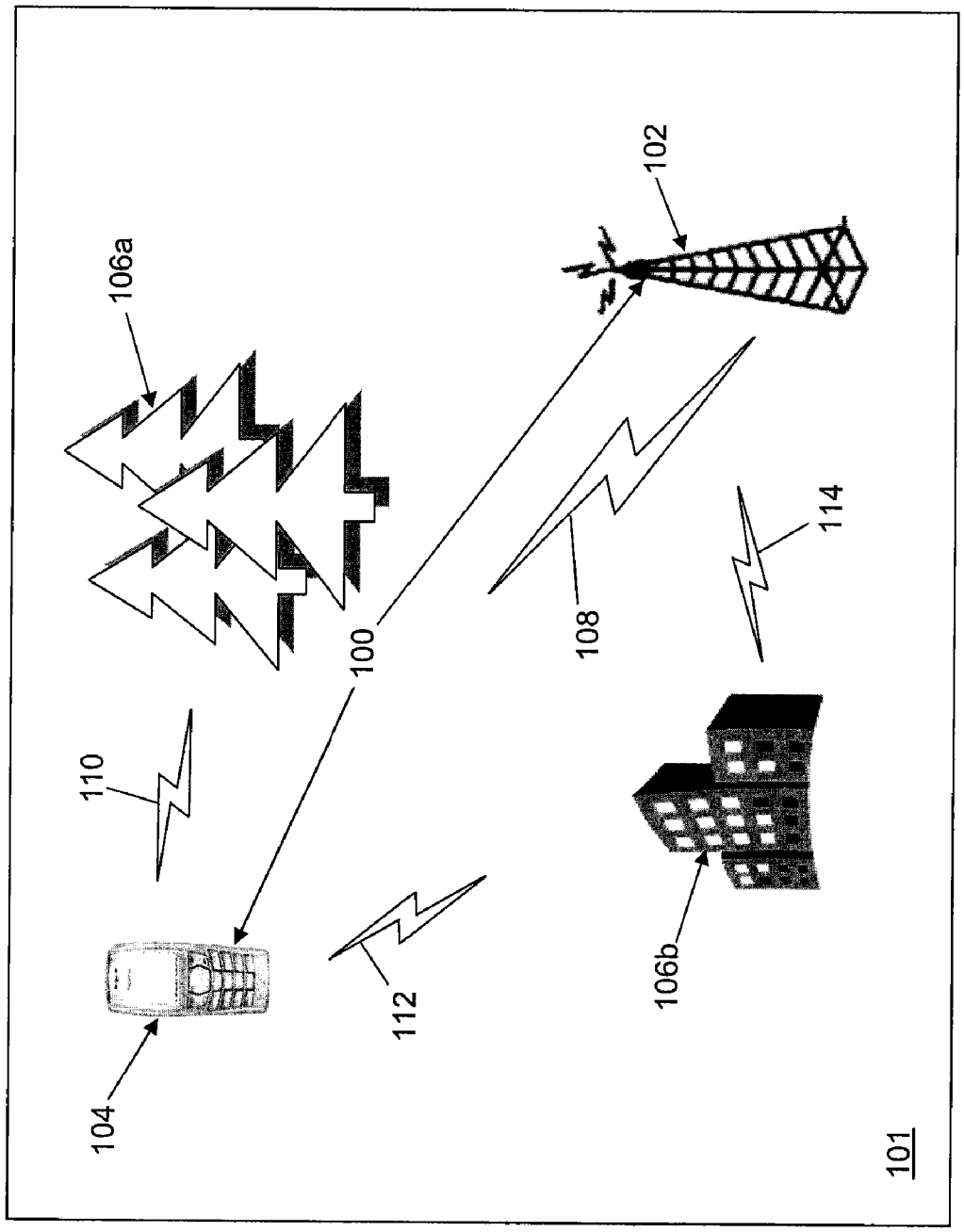
FIG. 1 shows a system in a scattering environment in accordance with an illustrative embodiment.

With reference to FIG. 1, a system 100 is shown in accordance with an illustrative embodiment. System 100 is located within a scattering environment 101 that may include, for example, a first scatterer 106a and a second scatterer 106b. There may be any number of scatterers in scattering environment 101 of the same or different types. Scatterers include any objects in the physical environment such as buildings, vehicles, vegetation, the terrain, weather, etc. capable of reflecting electromagnetic waves.

With reference to the illustrative embodiment of FIG. 1, system 100 is a communication system that may include a first transceiver device 102 and a second transceiver device 104. In an illustrative embodiment, first transceiver device 102 may include a base station of a wireless communication system and second transceiver device 104 may include a computer of any form factor, a personal data assistant, an instant messaging device, a phone, a radio, etc. In another illustrative embodiment, first transceiver device 102 may include a personal data assistant, a computer of any form factor, an instant messaging device, a phone, a radio, etc. In an alternative embodiment, system 100 may include first transceiver device 102 that is a sensor system, such as a radar or a sonar, to detect targets of various types within scattering environment 101.

With reference to the illustrative embodiment of FIG. 1, a wireless signal 108 transmitted from first transceiver device 102 to second transceiver device 104 is received at second transceiver device 104 as a delayed, attenuated, and, if either or both of first transceiver device 102 and second transceiver device 104 are moving, a Doppler shifted version of wireless signal 108. Wireless signal 108 also may be reflected and scattered by first scatterer 106a resulting in a second wireless signal 110 being received at second transceiver device 104. Second wireless signal 110 also is a delayed, attenuated, and possibly Doppler shifted version of wireless signal 108. Wireless signal 108 also may be reflected and scattered by second scatterer 106b resulting in a third wireless signal 112 being received at second transceiver device 104. Third wireless signal 112 also is a delayed, attenuated, and possibly Doppler shifted version of wireless signal 108. Wireless signal 108 also may be reflected and scattered by second scatterer 106b resulting in a fourth wireless signal 114 being received at first transceiver device 102. Fourth wireless signal 114 also is a delayed, attenuated, and possibly Doppler shifted version of wireless signal 108.

Second wireless signal 110, fourth wireless signal 114, and third wireless signal 112 are multipath signals. Multipath signal propagation results in multiple spatially distributed receive paths. Multipath propagation leads to signal fading—fluctuations in received signal strength—that can severely impact reliable communication and sensing functions. On the other hand, multipath is also a source of diversity based on the multiple statistically independent communication paths that can increase the rate and reliability of the communication and sensing functions. The impact of multipath fading versus diversity on performance depends on the amount of channel state information (CSI) available to the system. For example, knowledge of instantaneous CSI at the receiving device for coherent reception enables exploitation of diversity to combat fading. Additionally, gains in capacity and reliability are possible if even partial CSI is available at the transmitting device as well.

The statistical characteristics of a wireless channel or sensing environment depend on the interaction between scattering environment 101 and the signal space of first transceiver device 102 and second transceiver device 104. Signal space parameters include bandwidth (i.e. narrowband, wideband), the number of transceiver antennas, the antenna spacing, pulse duration, frequency, etc. Accurate channel modeling and characterization in time, frequency, and space, as a function of multipath and signal space characteristics enables exploitation of technological advances including frequency and bandwidth agility and reconfigurable antenna arrays and support coherent processing.

Figure 2:
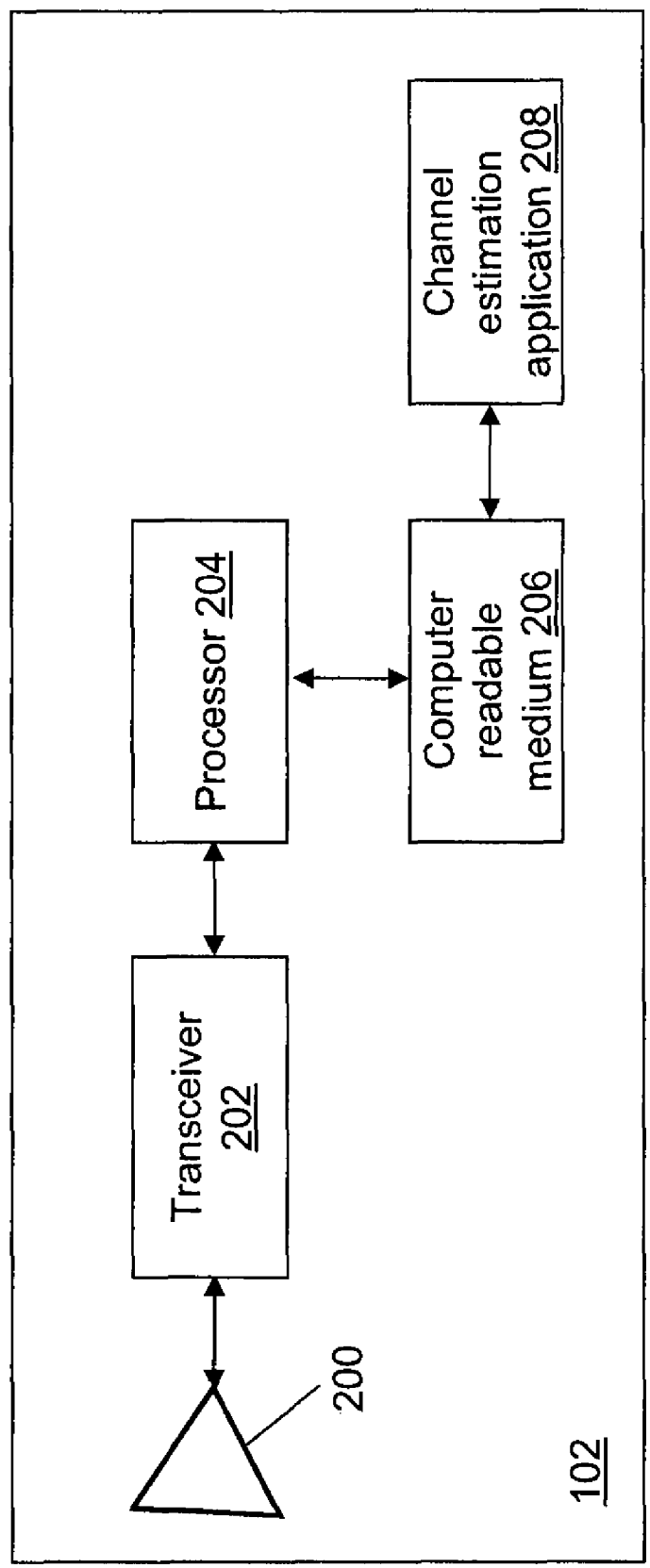
FIG. 2 shows a block diagram of a transceiver device of the system of FIG. 1 in accordance with an illustrative embodiment.

With reference to FIG. 2, a block diagram of first transceiver device 102 is shown in accordance with an illustrative embodiment. First transceiver device 102 may include an antenna 200, a transceiver 202, a processor 204, a computer-readable medium 206, and a channel estimation application 208. Second transceiver device 104 may include similar components. In another illustrative embodiment, first transceiver device 102 and/or second transceiver device 104 may include a separate transmitter and receiver. First transceiver device 102, of course, may include different and additional components such as a signal generator, a signal processor, etc. not explicitly shown in FIG. 2. First transceiver device 102 may include a plurality of antennas arranged in an array. The number and type of antennas of first transceiver device 102 may be different from the number and type of antennas of second transceiver device 104. The plurality of antennas may be arranged to form a uniform or a non-uniform linear array, a rectangular array, a circular array, a conformal array, etc. An antenna of the plurality of antennas may be a dipole antenna, a monopole antenna, a helical antenna, a microstrip antenna, a patch antenna, a fractal antenna, etc. The plurality of antennas may be reconfigurable spatially such that an antenna spacing between the plurality of antennas can be adjusted. Antenna 200 may be steerable.

Transceiver 202 processes electromagnetic signals received by antenna 200 and to be transmitted by antenna 200 under control of processor 204. First transceiver device 102 and/or second transceiver device 104 may include a plurality of transceivers that use the same or a different transmission/reception technology.

Processor 204 executes computer-readable instructions as known to those skilled in the art. The computer-readable instructions may be carried out by a special purpose computer, logic circuits, or hardware circuits. Thus, processor 204 may be implemented in hardware, firmware, software, or any combination of these methods. The term "execution" is the process of running an application or the carrying out of the operation called for by a computer-readable instruction. The computer-readable instructions may be written using one or more programming language, scripting language, assembly language, etc. Processor 204 executes a computer-readable instruction, meaning that it performs the operations called for by that computer-readable instruction. Processor 204 operably couples with transceiver 202 and computer-readable medium 206 to receive, to send, and to process information and/or to control the operations of first transceiver device 102. Processor 204 may retrieve a set of computer-readable instructions from a permanent memory device such as a read only memory device (ROM) and copy the instructions in an executable form to a temporary memory device that is generally some form of random access memory (RAM). First transceiver device 102 and/or second transceiver device 104 may include a plurality of processors that use the same or a different processing technology.

Computer-readable medium 206 is an electronic holding place or storage for information so that the information can be accessed by processor 204 as known to those skilled in the art. Computer-readable medium 206 can include, but is not limited to, any type of RAM, any type of ROM, any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. First transceiver device 102 and/or second transceiver device 104 may have one or more computer-readable media that use the same or a different memory media technology. First transceiver device 102 and/or second transceiver device 104 also may have one or more drives that support the loading of a memory media such as a CD, a DVD, a flash memory card, etc.

Channel estimation application 208 includes operations which estimate and/or characterize the channel state within scattering environment 101 based on the signal space characteristics. The operations may be implemented using hardware, firmware, software, or any combination of these methods. With reference to the illustrative embodiment of FIG. 2, channel estimation application 208 is implemented in software, i.e. computer-readable instructions, stored in computer-readable medium 206 and accessible by processor 204 for execution of the computer-readable instructions that embody the operations of channel estimation application 208. The computer-readable instructions of channel estimation application 208 may be written using one or more programming languages, assembly languages, scripting languages, etc. The functionality provided by channel estimation application 208 may be distributed among one or more modules and across one or more devices. In an illustrative embodiment, first transceiver device 102 and/or second transceiver device 104 may characterize the channel state and send the channel state information back from the receiver to the transmitter to enable transceiver adaptation for enhanced spectral efficiency and interference management. For example, the channel state may be characterized by channel coefficients.

Figure 3:
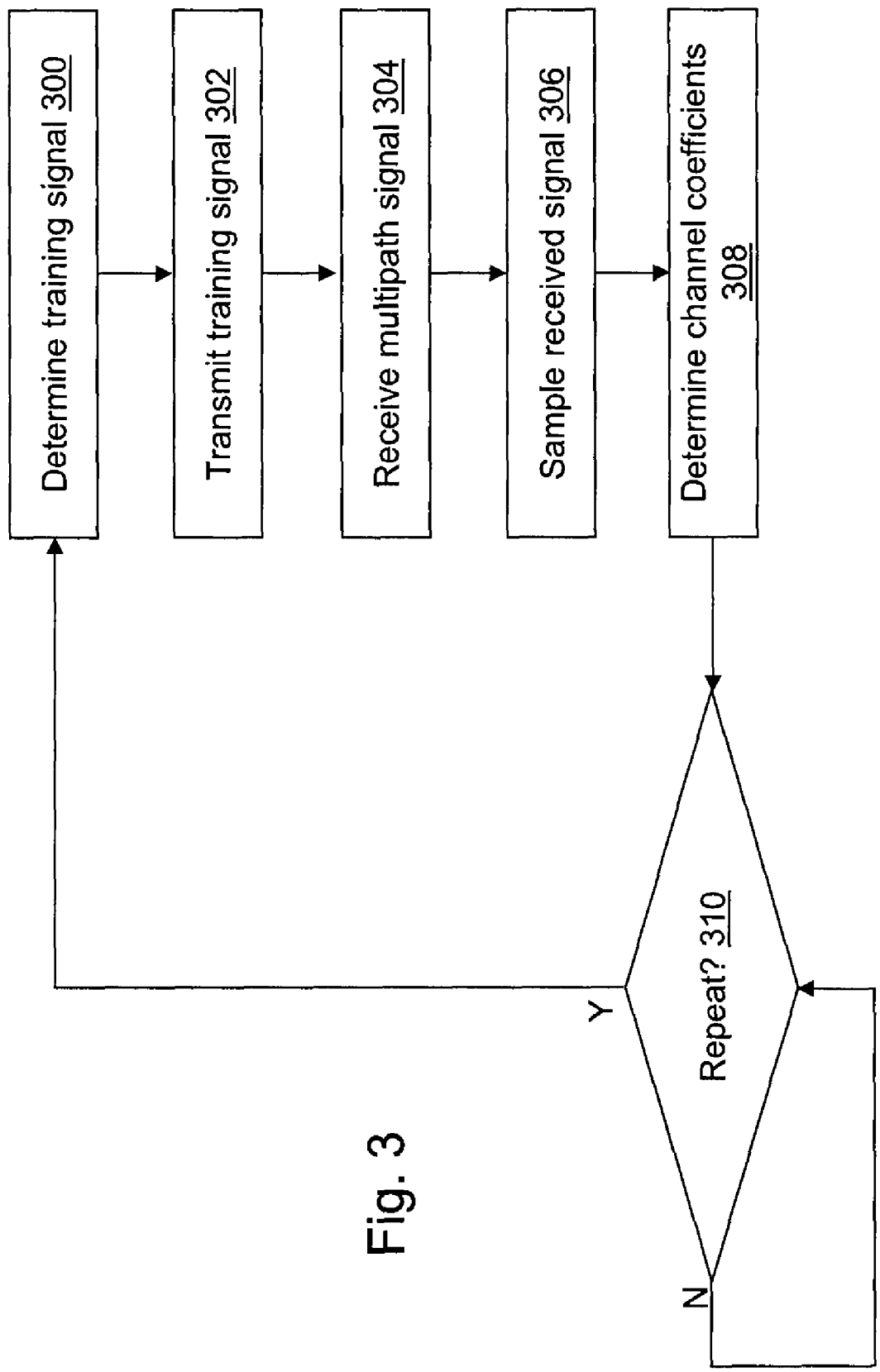
FIG. 3 depicts a flow diagram illustrating exemplary operations performed by the transceiver device of FIG. 2 in accordance with an illustrative embodiment.

With reference to FIG. 3, illustrative operations associated with channel estimation application 208 of FIG. 2 are described. Additional, fewer, or different operations may be performed, depending on the embodiment. The order of presentation of the operations of FIG. 3 is not intended to be limiting. In an operation 300, a training signal is determined. In an operation 302, the determined training signal is transmitted using transceiver 202 and antenna 200. In an operation 304, a multipath signal is received. Depending on the embodiment, the training signal determination and transmission and the multipath signal reception may be performed at the same transceiver device. For example, if the transceiver device is associated with a radar or a sonar system. In an alternative embodiment, the training signal determination and transmission may be performed at first transceiver device 102 while the multipath signal reception may be performed at second transceiver device 104 or vice versa. In an illustrative embodiment, the training signal is determined at the transceiver device receiving the multipath signal as part of signaling from the transmitting transceiver device, an a priori determination as part of the system configuration, etc. so that the training signal is known at the transceiver device receiving the multipath signal and can thus be determined. In an illustrative embodiment, the training signal may not change once determined. In another illustrative embodiment, the training signal may be dynamically determined based, for example, on scattering environment 101 and/or on the current signal space characteristics for a given communication or sensing function.

In an operation 306, the received multipath signal is sampled. For example, the received multipath signal may be sampled in time, i.e. chip-rate sampling, projected onto a receive side signaling basis functions, i.e. multitone waveforms, to yield a discrete version of the received multipath signal, etc. In an operation 308, channel coefficients are determined based on the sampled multipath signal and the determined training signal using a mixed-norm convex optimization process. As used herein, a mixed-norm convex optimization process is a mathematical process for optimization of a convex objective function, possibly subject to convex equality and convex inequality constraints, such that the entire optimization setup (objective function and constraints, if they exist) contain at least two different vector norms, for example, $l_2$ and $l_1$ norms, $l_1$ and $l_\infty$ norms, etc. In an illustrative embodiment, the mixed-norm convex optimization process is a Dantzig selector or a Lasso estimator. In an operation 310, a determination is made concerning whether or not to repeat the channel estimation process. For example, the channel estimation process may be repeated periodically, for each reception, at an initiation of a communication link, with a change in signaling parameters such as a frequency, bandwidth, or antenna spacing change, etc.

Illustrative channel estimation processes based on different signal space characteristics are described with additional detail below. A channel model is formed, a training signal is selected, and an estimator is applied for each example process.

In a first illustrative embodiment, first transceiver device 102 and second transceiver device 104 include single antennas and the channel is identified as frequency-selective because the channel impulse response remains constant over the time duration of interest and the channel maximum delay spread $T_m$ is large relative to the inverse of the communication bandwidth W, such that $T_m W \geq 1$. A "channel model" is a discrete approximation of the continuous time channel at the delay resolution dictated by the channel signaling parameters. The channel model captures the relationship between the clustering of physical paths and the sparsity of dominant channel coefficients. The complex baseband transmitted and received signals can be related as $$y(t) = \int_0^{T_m} h(\tau)x(t-\tau)d\tau + z(t) \quad (1)$$

where $h(\tau)$ is the channel impulse response, $x(t)$, $y(t)$, and $z(t)$ represent the transmitted, the received, and the additive white Gaussian noise (AWGN) waveforms, respectively.

Frequency-selective channels generate multiple delayed and attenuated copies of the transmitted waveform. For such "multipath" channels, $h(\tau)$ can be modeled as $$h(\tau) = \sum_{i=1}^{N_p} \alpha_i \delta(\tau - \tau_i) \quad (2)$$

and the transmitted and received waveforms related by $$y(t) = \sum_{i=1}^{N_p} \alpha_i x(t - \tau_i) + z(t) \quad (3)$$

which corresponds to signal propagation along $N_p$ physical paths, where $\alpha_i \epsilon C$ and $\tau_i \epsilon [0, T_m]$ are the complex path gain and the delay associated with the i-th physical path, respectively.

The discrete path model of equation (2), while realistic, is difficult to analyze and identify due to nonlinear dependence on the real valued delay parameters $\{\tau_i\}$. However, because the communication bandwidth W is limited, the continuous-time channel can be accurately approximated by a channel model with the aid of sampling theorems and/or power series expansions. The channel model provides a discrete approximation of frequency-selective channels by uniformly sampling the physical multipath environment in delay at a resolution commensurate with W, i.e., $$y(t) \approx \sum_{j=0}^{p-1} \beta_j x(t - j/W) + z(t) \quad (4)$$

$$\beta_j \approx \sum_{i \in S_{\tau,j}} \alpha_i \mathrm{sinc}(j - W\tau_i) \quad (5)$$

where $p = \lceil T_m W \rceil + 1$, $\mathrm{sinc}(a) = \sin(\pi a)/\pi a$, and $S_{\tau,j} = \{i: \tau_i \epsilon [j/W - \frac{1}{2}W, j/W + \frac{1}{2}W]\}$ denotes the set of all physical paths whose delays lie within the delay resolution bin of width $\Delta\tau = 1/W$ centered around the j-th resolvable virtual delay, $\hat{\tau}_j = j/W$. $\{\beta_j\}$ are termed as the channel coefficients in the delay space.

Figure 4:
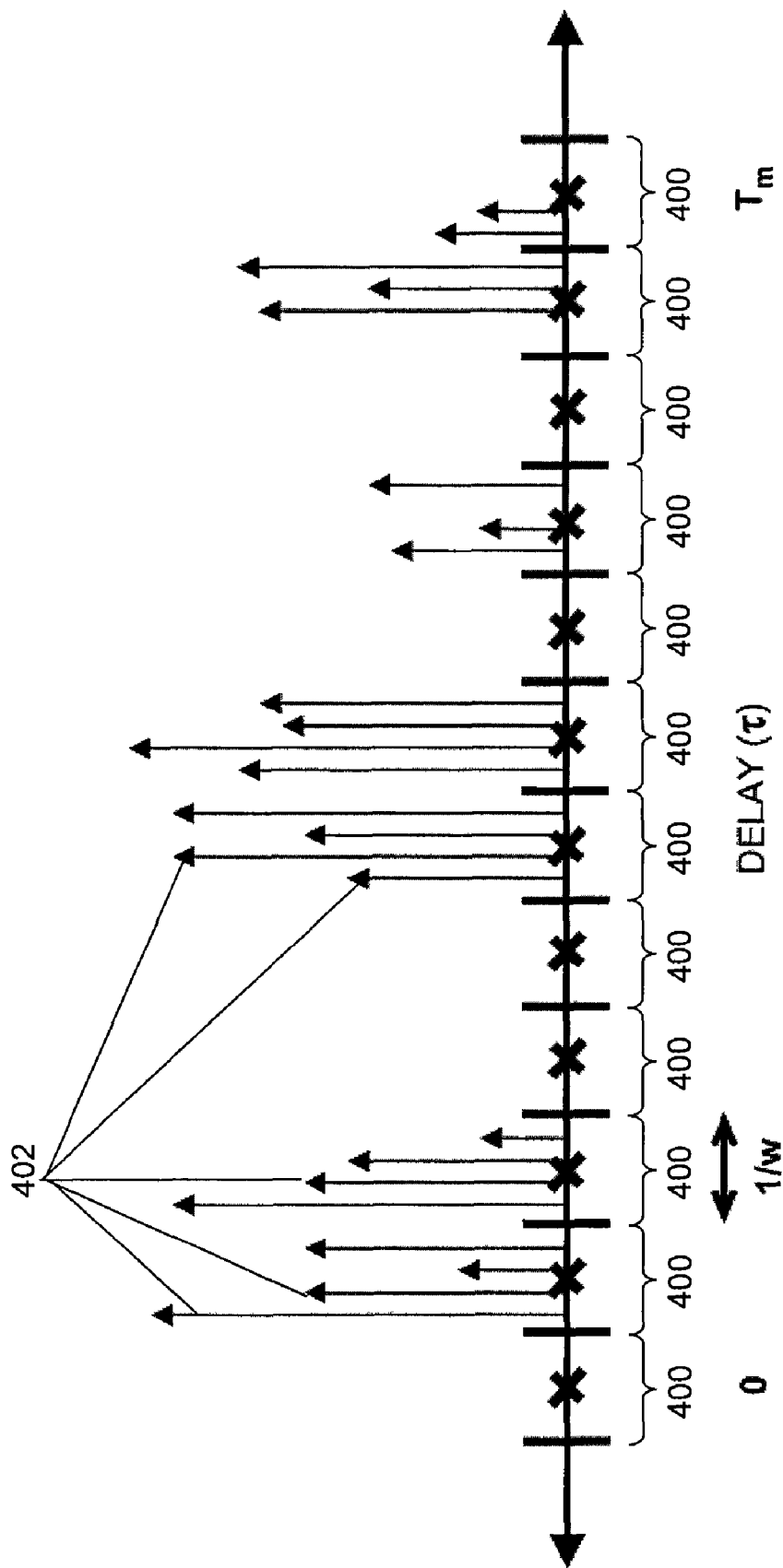
FIG. 4 shows a schematic illustrating a virtual representation of a single-antenna, frequency-selective channel in accordance with an illustrative embodiment.

With reference to FIG. 4, a plurality of resolution bins 400 having a resolution of 1/W are shown for a time window [0, $T_m$]. The plurality of vertical arrows 402 indicate gains received from different paths at a delay $\tau$. Equation (5) states that the coefficient $\beta_j$ for each of the plurality of resolution bins 400 is approximately the sum of the gains of all paths within the j-th delay resolution bin obtained at the center of each of the plurality of resolution bins 400. The accuracy of the approximation increases with the bandwidth W due to the resulting increase in delay resolution.

Based on the interarrival times between different multipath clusters within the delay spread, channels can be categorized as either "rich" or "sparse". In a rich multipath channel, the interarrival times are smaller than the inverse of the communication bandwidth W. Sparse multipath channels, on the other hand, exhibit interarrival times that are larger than 1/W, for example as shown in FIG. 4, where not every resolution bin contains a multipath component. In particular, since a channel coefficient consists of the sum of the gains of all paths falling within its respective delay bin, sparse frequency-selective channels tend to have far fewer nonzero channel coefficients than the number of the plurality of resolution bins 400 at any fixed, but large enough bandwidth. Thus, the multipath channel may be considered sparse if the number of nonzero channel coefficients is less than the number of resolvable paths p that is $p=\lceil T_m W \rceil+1$.

The continuous-time received signal y(t) can be chip-rate sampled at a rate of 1/W at the receiver to obtain an equivalent discrete time representation of equation (4) as $$y=x*\beta+z \Rightarrow y=X\beta+z \quad (6)$$

where * denotes the discrete convolution operator, $\beta \in C^p$ is the vector of channel coefficients, and x, y, and z are the vectors of samples of x(t), y(t), and z(t), respectively. The dimensions of x, y, and z are dictated by the input signaling duration $T_s$, where x(t)=0 for all $t \notin [0,T_s]$. $n(=\lceil T_s W \rceil)$ denotes the number of nonzero samples of x(t), resulting in $x \in C^n$ and $y,z \in C^{n+p-1}$. The matrix X is an (n+p−1)×p Toeplitz-structured, convolution matrix formed from vector x.

In an illustrative embodiment, β is modeled as a deterministic, but unknown vector. A power constraint also may be applied on the transmitted signal x(t) that can be readily translated into an average power constraint on the entries of x. Without loss of generality, it can be assumed that $\max_k E[|x_k|^2] \leq 1$ and that the entries of z correspond to an independent and identically distributed (iid) complex Gaussian white noise sequence.

The virtual representation of a frequency-selective channel captures its essential characteristics in terms of the channel coefficients $\{\beta_j\}$, the determined (selected) training signal x, and the received multipath signal y. An estimator $\hat{\beta}_{CS}$ of the sparse channel can be formed by solving either an $\ell_1$ penalized least squares problem using the "lasso" estimator, as described in R. Tibshirani, "Regression shrinkage and selection via the lasso," *J. Roy. Statist Soc. Ser. B*, pp. 267-288, 1996 (hereinafter referred to as the lasso estimator), or a linear program called the "Dantzig selector" as described in E. Candés and T. Tao, "The Dantzig selector: Statistical estimation when p is much larger than n," *Ann. Statist*, pp. 2313-2351, December 2007 (hereinafter referred to as the Dantzig selector).

As a first illustrative training signal used in a frequency-selective channel, a multi-carrier signal comprising an OFDM basis for the $N_0$-dimensional signal space is generated via frequency shifts of a fixed prototype pulse can be used of the form $$g(t): \gamma_k(t)=g(t)e^{j2\pi kt/T}, k \in S=\{0,1,\ldots,N_0-1\} \quad (7)$$

where $N_0=TW$. In an illustrative embodiment, the pulse is assumed to have unit energy, $\int |g(t)|^2 dt=1$. The training waveform may randomly dedicate $N_r$ of the $N_0$ basis elements as "pilot tones" such that $$x(t) = \sqrt{\frac{\varepsilon}{N_r}} \sum_{m \in S_r} \gamma_m(t), 0 \leq t < T$$

where the set of indices of pilot tones, $S_r$ consists of $N_r$ elements randomly selected from S and ε is the transmit energy budget available for training purposes. At the receiver, projecting the (noisy) received signal y(t) onto the OFDM basis waveforms yields $$y_m = \langle y, \gamma_m \rangle \approx \sqrt{\frac{\varepsilon}{N_r}} H_m + z_m m \in S_r$$

where $\langle y, \gamma_m \rangle = \int y(t)\overline{\gamma_m(t)}dt, \{z_m\}$ corresponds to an AWGN sequence and the channel coefficients are given by $H_m \approx H(f)|_{f=m/T}$.

The virtual representation implies that $$H(f) \approx \sum_{l=0}^{p-1} h_l e^{-j2\pi \frac{l}{W} f}.$$

As a result, the OFDM channel coefficients $H_m$ can be written as $$H_m = \sum_{l=0}^{p-1} h_l e^{-j2\pi \frac{l}{N_0}m} = u_{f,m}^T h$$

where h is the p-dimensional vector of channel coefficients, $$u_{f,m} = \begin{bmatrix} 1 & \omega_{N_0}^{1m} & \ldots & \omega_{N_0}^{(L-1)m} \end{bmatrix}^T \in C^L$$

where $$\omega_{N_0} = e^{-j\frac{2\pi}{N_0}} \text{ and } n = 0, 1, \ldots, N_0-1.$$

y=Xh+z where the $N_r$ sensing matrix X is comprised of $\{\sqrt{\varepsilon/N_r}u_{f,m}^T : m \in S_r\}$ as its rows and the AWGN vector z is distributed as $CN(0_{N_r}, I_{N_r})$.

The virtual model channel coefficients can be determined as a solution to the Dantzig selector as $$\hat{\beta} = \underset{\tilde{\beta} \in C^p}{\operatorname{argmin}} \|\tilde{\beta}\|_{l_1} \text{ subject to } \|X^H r\|_{l_\infty} \leq \lambda \quad (8)$$

where $\hat{\beta}$ are the estimated channel coefficients, $\|\|_{l_1}$ is an $\ell_1$ norm, $\|\|_{l_\infty}$ is an $\ell_\infty$ norm, p a maximum number of channel coefficients, $C^p$ is a p-dimensional complex space, X is the sensing matrix $\{\sqrt{\varepsilon/N_r}u_{f,m}^T : m \in S_r\}$, r is the $N_r$ dimensional vector of residuals: r=y−Xĥ, y is the sampled multipath signal, and λ is a tuning parameter selected to control a number of channel coefficients to be determined. In an illustrative embodiment, $\lambda(p,\varepsilon)=\sqrt{2\varepsilon(1+a)\log p}$ where ε is a transmit energy budget for the training signal and any a≧0. In a non-sparse environment, the same method can be used to determine the first const·$N_r/\log^4 N_0$ largest channel coefficients. In another illustrative embodiment, a lasso estimator also may be used to determine the channel model coefficients.

As a second illustrative training signal used in a frequency-selective channel, a pseudo-random sequence $\{x_k\}_{k=0}^{n-1}$, where n is the input probe duration and the $x_k$'s are iid realizations from a zero mean, unit variance distribution f(x). In an illustrative embodiment, $\{x_k\}_{k=0}^{n-1}$ is a sequence of IID random variables drawn from a Rademacher distribution where $n \geq c_1 \cdot \log p \cdot S^2$ where is any constant $c_1 \geq 0$, S is the number of desired coefficients to recover. The virtual model channel coefficients can be determined as a solution to the Dantzig selector as in equation (9), where the entries of $\hat{\beta}$ are the estimated channel coefficients, $\|\|\|_{\ell_1}$ is an $\ell_1$ norm, $\|\|\|_{\ell_\infty}$ is an $\ell_\infty$ norm, p is a maximum number of channel coefficients, $C^p$ is a p-dimensional complex space, X is a sensing matrix, $r = y - X\hat{\beta}$ is a vector of residuals, y is the sampled multipath signal, and $\lambda$ is a tuning parameter selected to control a number of channel coefficients to be determined. Based on the first illustrative training signal, $p = \lceil T_m W \rceil + 1$ is the maximum number of nonzero channel coefficients, X is the (n+p−1)×p Toeplitz-structured, convolution matrix formed from the first illustrative training signal, n is the input probe duration, r is an (n+p−1)-dimensional vector of residuals, and $\lambda$ can be chosen as $\sqrt{2(1+a)\log p} \cdot \sigma$ for any $a \geq 0$, and $\sigma$ is a square root of the noise power. In an alternative embodiment, the lasso estimator can be used to determine the virtual model channel coefficients. In a non-sparse environment, the same method can be used to determine the first (n+p−1) largest channel coefficients.

With reference to FIGS. 5a and 5b, a comparison between use of a least squares estimator and use of a lasso estimator to determine the channel coefficients is shown. A training signal comprising an n=128 pseudo-random input probe to sense a p=128 length channel that has only ten channel coefficients 500 which were nonzero was used and are indicated as impulses in FIGS. 5a and 5b. The output of the channel was observed at a signal-to-noise ratio of −10 dB. Channel coefficients can be obtained by solving the least squares problem or a variant of it as $$\hat{\beta}_{LS} = (X^H X)^{-1} X^H y. \quad (10)$$

The least squares estimates were obtained by pseudo-inverting the matrix X as in equation (10). The lasso estimates were obtained by executing a gradient projection for sparse reconstruction as described in Figueiredo, et al., "Gradient projection for sparse reconstruction: Application to compressed sensing and other inverse problems," IEEE J. *Select. Topics Signal Processing*, pp. 586-597, December 2007. The results using the least squares estimator are shown in FIG. 5a. The results using the lasso estimator are shown in FIG. 5b. Using the lasso estimator, every nonzero channel coefficient 500 was identified and only one noise-only coefficient 502 was identified. In contrast, with reference to FIG. 5a, even a clairvoyantly thresholded least squares estimator would be unable to identify all of the nonzero channel coefficients 500 without also identifying a significant number of noise-only coefficients.

In a second illustrative embodiment, first transceiver device 102 and second transceiver device 104 include single antennas and the channel is identified as doubly-selective because the delay spread and Doppler spread of the channel are large relative to the inverse of the signaling bandwidth and duration, respectively, i.e., $W\tau_{max} \geq 1$ and $T\nu_{max} \geq 1$. W is the two-sided bandwidth. $\tau_{max}$ is the delay spread of the channel and is defined as the maximum possible nonzero delay introduced by the channel. T is the packet duration. $\nu_{max}$ is the maximum possible (one-sided) Doppler shift caused by the channel. In the second illustrative embodiment, the channel includes underspread channels, characterized by $\tau_{max} \nu_{max} \ll 1$, and there is no interpacket interference in time and/or frequency, such that $T \gg \tau_{max}$ and $W \gg \nu_{max}$. The dimension of the receiver signal space is $N_0 \approx TW$, the time-bandwidth product.

The complex baseband transmitted and received signals in the absence of noise can be related as $$y(t) = \int_0^{\tau_{max}} h(t,\tau) x(t-\tau) d\tau \quad (11)$$

$$= \int H(t,f) X(f) e^{j2\pi ft} df$$

$$= \int_0^{\tau_{max}} \int_{-\nu_{max}/2}^{\nu_{max}/2} C(\nu,\tau) x(t-\tau) e^{j2\pi \nu t} d\nu d\tau$$

where x(t) and y(t) represent the transmitted and received waveforms, respectively, and X(f) is the Fourier transform of x(t). The channel is characterized by the time-varying impulse response, $h(t,\tau)$, or the time-varying frequency response, $H(t,f)$, or the delay-Doppler spreading function, $C(\nu,\tau)$ which are all three equivalent channel characterizations related to each other via Fourier transforms.

Doubly-selective channels generate multiple delayed, Doppler-shifted, and attenuated copies of the transmitted waveform. A discrete path model may be used to capture the characteristics of doubly-selective channels in terms of the physical propagation paths. In the discrete path model, the delay-Doppler spreading function of the channel can be expressed as $$C(\nu,\tau) = \sum_{i=1}^{N_p} \alpha_i \delta(\nu - \nu_i) \delta(\tau - \tau_i) \quad (12)$$

and the transmitted and received waveforms related by $$y(t) = \sum_{i=1}^{N_p} \alpha_i e^{j2\pi \nu_i t} x(t - \tau_i) \quad (13)$$

which corresponds to signal propagation along $N_p$ physical paths, where $\alpha_i \in C$, $\nu_i \in [-\nu_{max}/2, \nu_{max}/2]$, and $\tau_i \in [0, \tau_{max}]$ are the complex path gain, the Doppler shift, and the delay associated with the i-th physical path, respectively.

Figure 6:
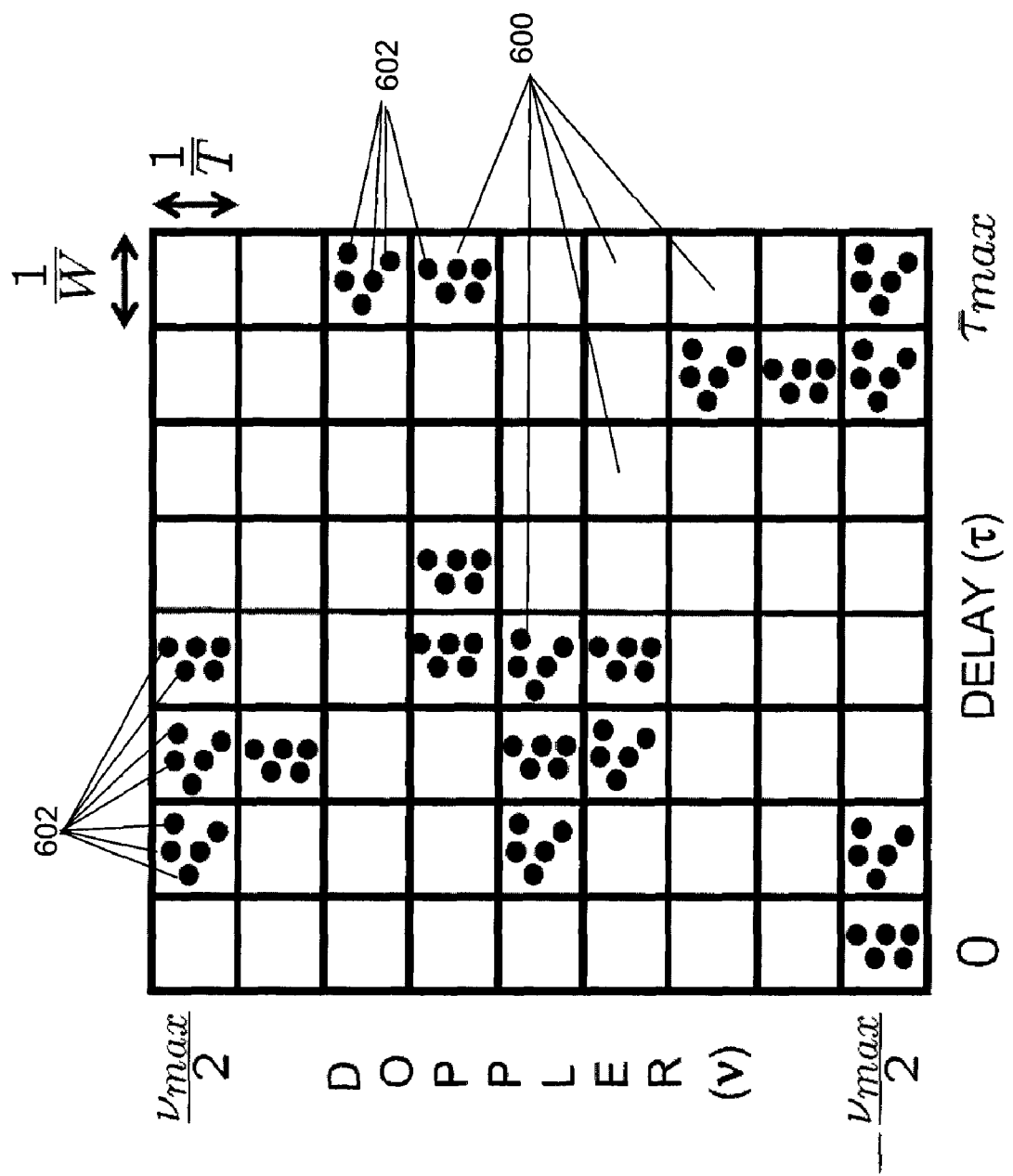
FIG. 6 shows a schematic illustrating a virtual representation of a single-antenna, doubly-selective channel in accordance with an illustrative embodiment.

Though realistic, equation (13) is difficult to analyze and learn due to its nonlinear dependence on a potentially large number of physical parameters $\alpha_i, \nu_i, \tau_i$. However, because of the finite signaling duration and bandwidth, the discrete path model can be accurately approximated by the channel model with the aid of sampling theorems and/or power series expansions. The channel model provides a low dimensional approximation of the discrete path model by uniformly sampling the physical multipath environment in the delay-Doppler domain at a resolution commensurate with W and T ($\Delta \tau = 1/W$, $\Delta \nu = 1/T$). That is, $$y(t) \approx \sum_{l=0}^{L-1} \sum_{k=-K}^{K} h_{l,k} e^{j2\pi \frac{k}{T}t} x(t - l/W) \quad (14)$$

$$h_{l,k} \approx \sum_{i \in S_{\tau,l} \cap S_{\nu,k}} \alpha_i e^{-j\pi(k - T\nu_i)} \text{sinc}(k - T\nu_i) \text{sinc}(l - W\tau_i) \quad (15)$$

where $\text{sinc}(a) = \sin(\pi a)/\pi a$ and $L = \lceil W\tau_{max} \rceil + 1$ and $K = \lceil T\nu_{max}/2 \rceil$ denote the maximum number of resolvable delays and one-sided, Doppler shifts within the delay-Doppler spreading function, respectively. The set $S_{\tau,l} = \{i : \tau_i \in [\ell/W - \frac{1}{2}W, l/W + \frac{1}{2}W)]\}$ is the set of indices of all paths whose delays lie within the delay resolution bin of width $\Delta\tau = 1/W$ centered around the l-th virtual delay, $\hat{\tau}_l = \ell/W$, while $S_{V,K} = \{i : \nu_i \in [k/T - \frac{1}{2}T, k/T + \frac{1}{2}T)]\}$ denotes the set of indices of all paths whose Doppler shifts lie within the Doppler resolution bin of width $\Delta\nu = 1/T$ centered around the k-th virtual Doppler shift, $\hat{\nu}_k = k/T$. The parameters $h_{l,k}$ are identified as the channel coefficients in the delay-Doppler domain. Equation (15) states that the channel coefficient $h_{l,k}$ approximately consist of the sum of the gains of all paths whose delays and Doppler shifts lie within the (l, k)-th delay-Doppler resolution bin of size $\Delta\tau \times \Delta\nu$ centered around the sampling point $(\hat{\tau}_l, \hat{\nu}_k) = (\ell/W, k/T)$ in the delay-Doppler domain, as illustrated in FIG. 6. In essence, the virtual representation of equation (14) effectively approximates a discrete path doubly-selective channel in terms of an N-dimensional parameter comprised of the channel coefficients $h_{l,k}$, where $N = L \times (2K+1) = (\lceil W\tau_{max} \rceil + 1) \cdot (2\lceil T\nu_{max}/2 \rceil + 1) \approx \tau_{max} \nu_{max} N_0$.

With reference to FIG. 6, a plurality of resolution bins 600 having a resolution of 1/W in the delay domain space, and 1/T in the Doppler spread domain space are shown for a time window $[0, \tau_{max}]$. The plurality of dots 602 indicate gains received from different paths at a delay $\tau$ and Doppler shift $\nu$.

Based on the interspacings between the multipath clusters within the delay-Doppler domain, doubly-selective channels can be characterized as either "rich" or "sparse". In a rich multipath channel, the interspacings are smaller than $\Delta\tau = 1/W$ in delay and $\Delta\nu = 1/T$ in Doppler shift. Sparse multipath channels, on the other hand, exhibit interspacings that are larger than $\Delta\tau$ and/or $\Delta\nu$, for example, as shown in FIG. 6, where not every resolution bin contains a multipath component or "dot" indicating a multipath component. In particular, since a channel coefficient consists of the sum of the gains of all paths falling within its respective delay-Doppler resolution bin, sparse doubly-selective channels tend to have far fewer than N nonzero channel coefficients at any fixed, but large enough signaling duration and/or bandwidth. Thus, the doubly selective channel may be considered sparse if $D \ll N$ where $D = |\{(\ell, k) : h_{l,k} \neq 0\}|$ and $N = L \times (2K+1) \approx \tau_{max} \nu_{max} N_0$ is the total number of resolvable delays and Doppler shifts (channel coefficients) within the delay-Doppler spread.

As a first illustrative training signal used in a doubly-selective channel, a single-carrier spread spectrum waveform corresponding to a particular spreading code with binary phase shift keying as the modulation scheme can be used. The resulting training waveform x(t) can be represented as $$x(t) = \sum_{n=0}^{N_0-1} x_n I_{[0,T_c)}(t - nT_C), \quad 0 \leq t < T \quad (16)$$

where $I_{[0,T_c)}(t)$ is the chip waveform, $T_c \approx 1/W$ is the chip duration, and $\{x_n \in \mathfrak{R}\}$ is the spreading code corresponding to the training signal waveform. The output of the channel corresponding to x(t) is given by $$y(t) \approx \sum_{l=0}^{L-1} \sum_{k=-K}^{K} h_{l,k} e^{j2\pi \frac{k}{T}t} x(t - l/W) + z(t) \quad 0 \leq t < T + \tau_{max} \quad (17)$$

where z(t) is a zero-mean, circularly symmetric, complex AWGN waveform. For spread spectrum waveforms, chip-rate sampling of y(t) at the receiver yields an equivalent discrete-time representation $$y_n = \sum_{l=0}^{L-1} \sum_{k=-K}^{K} h_{l,k} e^{j2\pi \frac{k}{N_0} n} x_{n-l} + z_n, \quad n = 0, 1, \ldots, N_0 + L - 2 \quad (18)$$

where $\{z_n\}$ corresponds to a zero-mean, circularly symmetric, complex AWGN sequence and $N_0 \approx TW$ is the dimension of the receiver signal space.

If $\tilde{N}_0 = N_0 + L - 1$ and an $\tilde{N}_0$-length sequence of vectors $\{x_n \in \mathbb{C}^L\}$ is defined comprising the spreading code $\{x_n\}$ as $x_n = [x_n \, x_{n-1} \, \ldots \, x_{n-(L-1)}]$ for $n = 0, 1, \ldots, \tilde{N}_0 - 1$ where the notational understanding is that $x_i = 0$ for $i \notin \{0, 1, \ldots N_0 - 1\}$, and if $$H = \begin{bmatrix} h_{0,-K} & h_{0,-K+1} & \ldots & h_{0,K} \\ h_{1,-K} & h_{1,-K+1} & \ldots & h_{1,K} \\ \vdots & \vdots & \ldots & \vdots \\ h_{L-1,-K} & h_{L-1,-K+1} & \ldots & h_{L-1,K} \end{bmatrix} \quad (19)$$

is the $L \times (2K+1)$ matrix of channel coefficients, and $\{u_n \in \mathbb{C}^{2K+1}\}$ is an $\tilde{N}_0$-length sequence of phase vectors given by $$u_n = [\omega_{N_0}^{Kn} \omega_{N_0}^{(K-1)n} \ldots \omega_{N_0}^{-Kn}]^T \quad (20)$$

where $$\omega_{N_0} = e^{-j\frac{2\pi}{N_0}}$$

and $n = 0, 1, \ldots, \tilde{N}_0 - 1$, the sequence $\{y_n\}$ in equation (18) can be written as $$y_n = x_n^T H u_n + z_n \quad (21)$$
$$= (u_n^T \otimes x_n^T) \text{vec}(H) + z_n$$
$$= (u_n^T \otimes x_n^T) h + z_n, \quad n = 0, 1, \ldots, \tilde{N}_o - 1$$

If $h = \text{vec}(H) \in \mathbb{C}^N$ is the vector of channel coefficients, and the $y_n$'s are stacked into an $\tilde{N}_0$ dimensional vector y, the following system of equations results $$y = Xh + z \quad (22)$$

where the $\tilde{N}_0 \times N$ sensing matrix X is comprised of $\{u_n^T \otimes x_n^T\}$ as its rows: $X = [u_0 \otimes x_0 \ldots u_{\tilde{N}_0-1} \otimes x_{\tilde{N}_0-1}]^T$. In an illustrative embodiment, the spreading code $\{x_n\}$ is generated from a Rademacher distribution, i.e., the $x_n$'s independently take values of $\sqrt{\epsilon/N_0}$ or $-\sqrt{\epsilon/N_0}$ with probability of 0.5 each where $\epsilon$ is a transmit energy budget for the training signal.

The channel model coefficients can be determined as a solution to the selector $$\hat{h} = \underset{\tilde{h} \in C^N}{\text{argmin}} \|\tilde{h}\|_{l1} \text{ subject to } \|X^H r\|_{l_\infty} \leq \lambda \quad (23)$$

where $\hat{h}$ are the estimated channel coefficients, $\|\|_{l_1}$ is an $\ell_1$ norm, $\|\|_{l_\infty}$ is an $l_\infty$ norm, $N=L\times(2K+1)=(\lceil W\tau_{max}\rceil+1)\cdot(2\lceil Tv_{max}/2\rceil+1)\approx\tau_{max}v_{max}N_0$ a maximum number of non-zero channel coefficients, $C^N$ is a set of non-zero channel coefficients, X is the sensing matrix $X=[u_0 \otimes x_0 \ldots u_{\tilde{N}_0-1} \otimes x_{\tilde{N}_0-1}]^T$, r is the $\tilde{N}_0$ dimensional vector of residuals: $r=y-X\tilde{h}$, y is the sampled multipath signal, and $\lambda$ is a tuning parameter selected to control a number of channel coefficients to be determined. In an illustrative embodiment, $\lambda(N,\epsilon)=\sqrt{2\epsilon(1+a)\log N}$ where $\epsilon$ is a transmit energy budget for the training signal and any $a\geq 0$. In another illustrative embodiment, a lasso estimator may be used to determine the channel model coefficients. In a non-sparse environment, the same method can be used to determine the first $S=\text{const}\cdot\sqrt{N_0/\log p}$ largest channel coefficients.

As a second illustrative training signal used in a doubly-selective channel, a multi-carrier signal comprising a complete orthogonal short-time Fourier (STF) basis for the $N_0$-dimensional signal space is generated via time and frequency shifts of a fixed prototype pulse $g(t)$: $\gamma_{l,k}(t)=g(t-lT_o)e^{j2\pi k W_o t}$, $(l,k)\in S=\{0,1,\ldots,N_t-1\}\times\{0,1,\ldots,N_f-1\}$ where $N_t=T/T_0$ and $N_f=W/W_0$. In an illustrative embodiment, the prototype pulse is assumed to have unit energy, $\int |g(t)|^2 dt=1$, and completeness of $\{\gamma_{l,k}\}$ stems from the underlying assumption that $T_0W_0=1$, which results in a total of $N_tN_f=TW/T_0W_0=N_0$ basis elements. The training waveform may randomly dedicate $N_r$ of the $N_0$ STF basis elements as "pilot tones" such that $$x(t) = \sqrt{\frac{\varepsilon}{N_r}} \sum_{(n,m)\in S_r} \gamma_{n,m}(t), 0 \leq t < T \quad (24)$$

where the set of indices of pilot tones, $S_r$, consists of $N_r$ elements randomly selected from S and $\epsilon$ is the transmit energy budget available for training purposes. At the receiver, assuming that the basis parameters $T_0$ and $W_0$ are matched to the channel parameters $\tau_{max}$ and $v_{max}$ so that $\gamma_{l,k}$'s serve as approximate eigenfunctions for sufficiently underspread channels, projecting the (noisy) received signal y(t) onto the STF basis waveforms yields $$y_{n,m} = \langle y, \gamma_{n,m}\rangle \approx \sqrt{\frac{\varepsilon}{N_r}} H_{n,m} + z_{n,m} \ (n, m) \in S_r \quad (25)$$

where $\langle y, \gamma_{n,m}\rangle = \int y(t)\gamma_{n,m}(t)dt$, $\{z_{n,m}\}$ corresponds to an AWGN sequence and the STF channel coefficients are given by $H_{n,m}\approx H(t,f)|_{(t,f)=(nT_0,mW_0)}$.

The virtual representation of a doubly-selective channel implies that $$H(t, f) \approx \sum_{l=0}^{L-1} \sum_{k=-K}^{K} h_{l,k} e^{j2\pi \frac{k}{T}t} e^{-j2\pi \frac{l}{W}f}.$$

As a result, the STF channel coefficients $H_{n,m}$ can be written as $$\begin{aligned} H_{n,m} &= \sum_{l=0}^{L-1}\sum_{k=-K}^{K} h_{l,k} e^{j2\pi\frac{k}{N_t}n} e^{-j2\pi\frac{l}{N_f}m} \\ &= u'_{f,m} H u_{t,n} \\ &= (u'_{t,n} \otimes u'_{f,m}) vec(H) \\ &= (u'_{t,n} \otimes u'_{f,m}) h \end{aligned} \quad (26)$$

where H is the $L\times(2K+1)$ matrix of channel coefficients as in equation (19), $h=\text{vec}(H)\in C^N$, $u_{f,m}=[1 \ \omega_{N_f}^{1m} \ldots \omega_{N_f}^{(L-1)m}]^T \in C^L$, and $u_{t,n}=[\omega_{N_t}^{Kn} \ \omega_{N_t}^{(K-1)n} \ldots \omega_{N_t}^{-Kn}]^T \in C^{2K+1}$. Stacking the received training symbols $\{y_{n,m}\}$ into an $N_r$-dimensional vector y yields the following system of equations $$y=Xh+z \quad (27)$$

where the $N_r\times N$ sensing matrix X is comprised of $\{\sqrt{\epsilon/N_r}(u_{t,n}^T \otimes u_{f,m}^T):(n,m)\in S_r\}$ as its rows and the AWGN vector z is distributed as $CN(0_{N_r}, I_{N_r})$.

The channel model coefficients can be determined as a solution to the Dantzig selector as $$\hat{h} = \underset{\tilde{h} \in C^N}{\text{argmin}} \|\tilde{h}\|_{l_1} \text{ subject to } \|X^H r\|_{l_\infty} \leq \lambda \quad (28)$$

where $\hat{h}$ are the estimated channel coefficients, $\|\|_{l_1}$ is an $l_1$ norm, $\|\|_{l_\infty}$ is an $l_\infty$ norm, $N=L\times(2K+1)=(\lceil W\tau_{max}\rceil+1)\cdot(2\lceil Tv_{max}/2\rceil+1)\approx\tau_{max}v_{max}N_0$ a maximum number of channel coefficients, $C^N$ is a N-dimensional complex space, X is the sensing matrix $\{\sqrt{\epsilon/N_r}(x_{t,n}^T \otimes x_{f,m}^T):(n,m)\in S_r\}$, r is the $N_r$ dimensional vector of residuals: $r=y-X\tilde{h}$, y is the sampled multipath signal, and $\lambda$ is a tuning parameter selected to control a number of channel coefficients to be determined. In an illustrative embodiment, $\lambda(N,\epsilon)=\sqrt{2\epsilon(1+a)\log N}$ where $\epsilon$ is a transmit energy budget for the training signal and any $a\geq 0$. In a non-sparse environment, the same method can be used to determine the first $S=\text{const}\cdot N_r/\log^4 N_0$ largest channel coefficients. In another illustrative embodiment, a lasso estimator also may be used to determine the channel model coefficients.

In a third illustrative embodiment, first transceiver device 102 and second transceiver device 104 include uniform linear arrays of $N_T$ transmit antennas and $N_R$ receive antennas forming a multi-antenna (MIMO) channel. In the absence of noise, the corresponding baseband transmitted and received signal can be related as $$y(t) = \int_{-W/2}^{W/2} H(t,f)X(f)e^{j2\pi ft} df, 0 \leq t \leq T \quad (29)$$

where W is the two-sided bandwidth, T is the packet duration, y(t) is the $N_R$ dimensional received signal, X(f) is the (element-wise) Fourier transform of the $N_T$-dimensional transmitted signal x(t), and H(t,f) is the $N_R\times N_T$ time-varying frequency response matrix of the channel. A MIMO channel can be accurately modeled in terms of the multiple spatially distributed physical paths as $$H(t,f) = \sum_{n=1}^{N_p} \beta_n a_R(\theta_{R,n}) a_T^H(\theta_{T,n}) e^{j2\pi v_n t} e^{-j2\pi \tau_n f} \quad (30)$$

which represents signal propagation over $N_p$ paths. $\beta_n$ denotes the complex path gain, $\theta_{R,n}$ the angle of arrival (AoA) at the receiver, $\theta_{T,n}$ the angle of departure (AoD) at the transmitter, $\tau_n$ the relative delay, and $v_n$ the Doppler shift associated with the n-th path. The $N_T \times 1$ vector $a_T(\theta_T)$ and the $N_R \times 1$ vector $a_R(\theta_R)$ denote the array steering and response vectors, respectively, for transmitting/receiving a signal in the direction $\theta_T$, $\theta_R$ and are periodic in $\theta$ with unit period where $\theta = d\sin(\phi)/\lambda$, d is the antenna spacing, $\phi$ is the physical angle measured with respect to the array broadside, and $\lambda$ is the wavelength of propagation.

Figure 7:
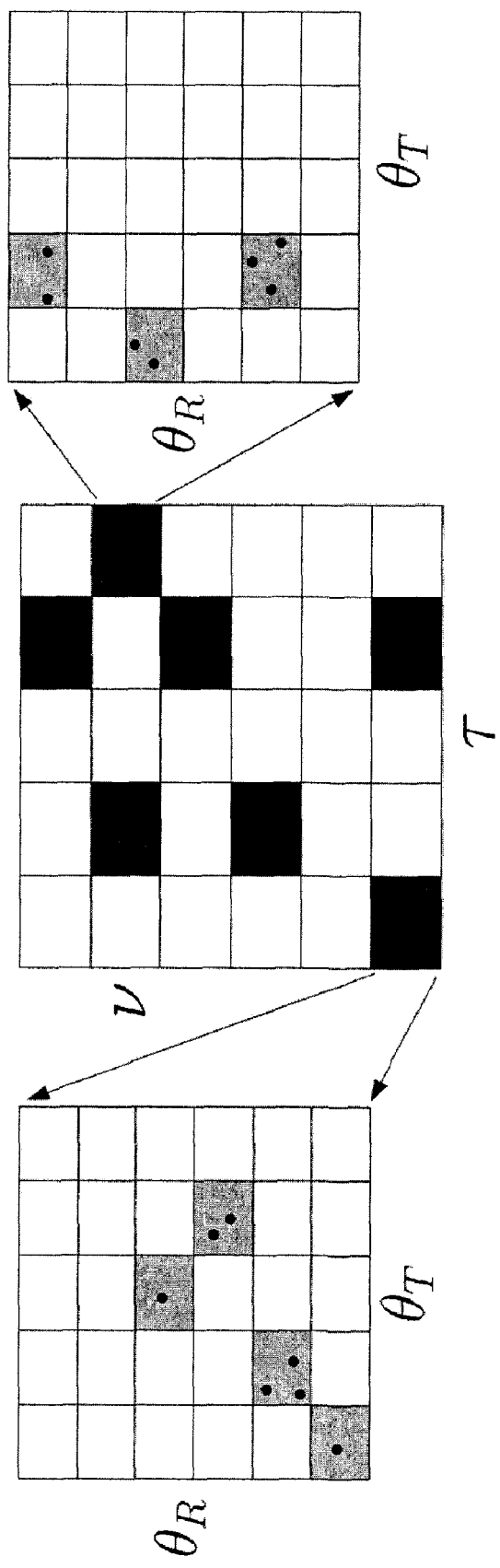
FIG. 7 shows a schematic illustrating a virtual representation of an angle-delay-Doppler channel in accordance with an illustrative embodiment.

While the physical model of equation (30) is highly accurate, it is difficult to analyze and learn due to its nonlinear dependence on a potentially large number of physical parameters. However, because of the finite transmit and receive array apertures, signaling duration, and bandwidth, the physical model can be well-approximated by a channel model with the aid of a Fourier series expansion. The channel model provides a low-dimensional approximation of equation (30) by uniformly sampling the multipath environment in the angle-delay-Doppler domain at a resolution commensurate with the signal space parameters: $(\Delta\theta_R, \Delta\theta_T, \Delta\tau, \Delta v) = (1/N_R, 1/N_T, 1/W, 1/T)$ That is, $$H(t,f) \approx \sum_{i=1}^{N_R} \sum_{k=1}^{N_T} \sum_{l=0}^{L-1} \sum_{m=-M}^{M} H_v(i,k,l,m) a_R\left(\frac{i}{N_R}\right) a_T^H\left(\frac{k}{N_T}\right) e^{j2\pi\frac{m}{T}t} e^{j2\pi\frac{l}{W}f} \quad (31)$$

$$H_v(i,k,l,m) \approx \sum_{n \in S_{R,i} \cap S_{T,k} \cap S_{\tau,l} \cap S_{v,m}} \beta_n \quad (32)$$

where a phase and an attenuation factor have been absorbed in the $\beta_n$'s in equation (32). In equation (31), $N_R$, $N_T$, $L = \lceil W\tau_{max} \rceil + 1$ and $M = \lceil Tv_{max}/2 \rceil$ denote the maximum number of resolvable AoAs, AoDs, delays, and one-sided Doppler shifts within the channel angle-delay-Doppler spread, respectively. Due to the fixed angle-delay-Doppler sampling of equation (30), which defines the fixed basis functions in equation (31), the virtual representation is a linear channel representation completely characterized by the channel coefficients $H_v(i,k,\ell,m)$. Additionally, equation (32) states that each $H_v(i,k,\ell,m)$ is approximately equal to the sum of the complex gains of all physical paths whose angles, delays, and Doppler shifts lie within an angle-delay-Doppler resolution bin of size $\Delta\theta_R \times \Delta\theta_T \times \Delta\tau \times \Delta v$ centered around the virtual sample point $(\hat{\theta}_{R,i}, \hat{\theta}_{T,k}, \hat{\tau}_l, \hat{v}_m) = (i/N_R, k/N_T, l/W, m/T)$ in the angle-delay-Doppler domain as shown with reference to FIG. 7. The virtual representation of equation (30) effectively approximates a physical MIMO channel in terms of a $D_{max}$-dimensional parameter comprising the channel coefficients $H_v(i,k,l,m)$, where $D_{max} = N_R N_T L(2M+1)$.

Based on the interspacings between the multipath clusters within the angle-delay-Doppler domain, MIMO channels can be characterized as either "rich" or "sparse". In a rich MIMO channel, the interspacings are smaller than $\Delta\theta_R, \Delta\theta_T, \Delta\tau, \Delta v$. Sparse MIMO channels, on the other hand, exhibit interspacings that are larger than $\Delta\theta_R, \Delta\theta_T, \Delta\tau$, and/or $\Delta v$ such that not every angle-delay-Doppler bin of size $\Delta\theta_R \times \Delta\theta_T \times \Delta\tau \times \Delta v$ contains a physical path as shown with reference to FIG. 7. In particular, since a channel coefficient consists of the sum of the gains of all paths falling within its respective angle-delay-Doppler resolution bin, sparse MIMO channels tend to have far fewer than $D_{max}$ nonzero channel coefficients at any fixed, but large enough number of antennas, signaling duration, and bandwidth. A MIMO channel is D-sparse if $D = |S_D| \ll D_{max}$, where $D_{max} = N_R N_T L(2M+1)$ is the total number of resolvable paths (channel coefficients) within the angle-delay-Doppler spread of the channel and $S_D = \{(i,k,\ell,m): |H_v(i,k,l,m)| > 0\}$.

If the signaling parameters are chosen so that the channel is non-selective $$H = \sum_n \beta_n a_R(\theta_{R,n}) a_T^H(\theta_{T,n}) \approx A_R H_v A_T^H \quad (33)$$

where $A_R$ and $A_T$ are $N_R \times N_R$ and $N_T \times N_T$ unitary discrete Fourier transform (DFT) matrices, respectively. The $N_R \times N_T$ beamspace matrix $H_v$ couples the virtual AoAs and AoDs, and its entries are given by the $D_{max} = N_R N_T$ channel coefficients $\{H_v(i,k)\}$. The channel is assumed to be D-sparse in the angular domain ($D = |S_D| \ll D_{max}$) and it remains constant over the packet signaling duration T with a blockfading assumption corresponding to $Tv_{max} \ll 1$.

To learn the $N_R \times N_T$ (antenna domain) matrix H, part of the packet duration T is used to transmit a training signal to the receiver. Stacking the $M_{tr} = T_{tr} W$ received vector-valued training signals $\{y(n), n=1, \ldots, M_{tr}\}$ into an $M_{tr} \times N_R$ matrix Y yields the following system of equations $$Y = \sqrt{\frac{\varepsilon}{M_{tr}}} XH^T + W \quad (34)$$

where $\varepsilon$ is the total transmit energy budget available for training, X is the collection of $M_{tr}$ training signal vectors $\{x(n), n=1, \ldots, M_{tr}\}$ stacked row-wise into an $M_{tr} \times N_R$ matrix with the constraint that $\|X\|_F^2 = M_{tr}$, and W is an $M_{tr} \times N_R$ matrix of unit-variance AWGN.

Given receiver processing in the antenna domain, let $\chi = \{1, \ldots, N_R\} \times \{1, \ldots, N_T\}$ be the set of indices of elements within the antenna domain matrix H, and let the number of receive signal space dimensions dedicated to training be $N_{tr} \geq c_2 \cdot \log^5 D_{max} \cdot D$ for some constant $C_2 > 0$, and choose $\chi_{tr}$ to be a set of $N_{tr}$ ordered pairs sampled uniformly at random from $\chi$. The number of transmitted training signals may be defined as $M_{tr} = |\{k:(i,k) \in \chi_{tr}\}|$ resulting in $y_{tr} = \sqrt{\varepsilon/M_{tr}}\{H(i,k)\}_{\chi_{tr}} + w$ where $y_{tr}$ is the vector of received training data and $w \sim CN(0_{N_{tr}}, I_{N_{tr}})$.

If $vec^{-1}$ denotes the inverse of the vec operator defined as stacking the columns of a matrix into a vector, and $\lambda = (2\tilde{\varepsilon}(1+a)\log D_{max})^{1/2}$ for any $a \geq 0$ where $\tilde{\varepsilon} = \varepsilon N_{tr}/D_{max}M_{tr}$, $a_{T,i}^T$ and $a_{R,i}^T$ denote the i-th row of $A_T^*$ and $A_R$, respectively, and considering an $N_{tr} \times D_{max}$ sensing matrix $U_{tr}$ that is comprised of $\{(a_{T,k}^T \otimes a_{R,i}^T):(i,k) \in \chi_{tr}\}$ as its rows, the estimate of the channel coefficients is obtained from $y_{tr}$ as follows:

$$\hat{H} = A_R(vec^{-1}(DS(\sqrt{\varepsilon/M_{tr}}U_{tr}, y_{tr}, \lambda))) A_T^H \quad (35)$$

The virtual channel model coefficients in equation (35) can be determined as a solution to the Dantzig selector, DS, defined as $$\hat{h} = \underset{\tilde{h} \in C^{D_{max}}}{\operatorname{argmin}} \|\tilde{h}\|_{l_1} \text{ subject to } \|X^H r\|_{l_\infty} \le \lambda \quad (36)$$

where $\hat{h}$ are the estimated channel coefficients, $\|\|_{l_1}$ is an $l_1$ norm, $\|\|_{l_\infty}$ is an $\ell_\infty$ norm, $D_{max} = N_R N_T$ a maximum number of non-zero channel coefficients, $C^{D_{max}}$ is a $D_{max}$-dimensional complex space, X is the sensing matrix $\sqrt{\epsilon/M_{tr}}$ $\{(a_{T,k}{}^T \otimes a_{R,i}{}^T) : (i,k) \in \chi_{tr}\}$, r is the D dimensional vector of residuals: $r = (y_{tr} - X_{tr}\hat{h})$, y is the sampled multipath signal, and $\lambda$ is a tuning parameter selected to control a number of channel coefficients to be determined such as $\lambda = (2\tilde{\epsilon}(1+a) \log D_{max})^{1/2}$. In a non-sparse environment, the same method can be used to determine the first D largest channel coefficients. In another illustrative embodiment, a lasso estimator may be used to determine the channel model coefficients.

Given receiver processing in the beamspace domain, let $h_{v,i}{}^T$ denote the i-th row of $H_v$ and define $D_i$ to be the number of nonzero virtual coefficients in each row of $H_v$; that is, $D_i = \|h_{v,i}\|_0$. The number of training vectors may be chosen as $M_{tr} \ge c_6 \cdot \log(N_T / \max_i D_i) \cdot \max_i D_i$ for some constant $c_6 > 0$ and each training vector $x(n), n = 1, \ldots, M_{tr}$ is an iid vector of binary random variables taking values $+1/\sqrt{N_T}$ or $-1/\sqrt{N_T}$ with probability 0.5 each. At the receiver, the received training signals $\{y(n), n =, \ldots, M_{tr}\}$ are stacked into an $M_{tr} \times N_R$ matrix Y to yield equation (34).

To determine the channel coefficients in an illustrative embodiment, define $Y_v = YA_R^*$ and let $y_{v,i}$ denote the i-th column of $Y_v$, select a $\lambda = (2\epsilon(1+a)(\log D_{max})/N_T)^{1/2}$ for an $a \ge 0$, and define $\hat{h}_{v,i} = DS(\sqrt{\epsilon/M_{tr}} X A_T^*, y_{v,i}, \lambda)$ for $i = 1, \ldots, N_R$ where DS denotes the Dantzig selector. The estimate of H is obtained as:

$$\hat{H} = A_R[\hat{h}_{v,1} \ldots \hat{h}_{v,N_R}]^T A_T^H \quad (36)$$

In a non-sparse environment, the same method can be used to determine the first $\text{const} \cdot M_{tr}/\log N_T$ largest nonzero channel coefficients per row of channel matrix $H_v$. In another illustrative embodiment, a lasso estimator may be used to determine the channel model coefficients.

If the signaling parameters are chosen so that the MIMO channel is frequency-selective such that $W\tau_{max} \ge 1$, limited to blockfading corresponding to $T\nu_{max} \ll 1$, and assuming that the communication packet is comprised of $N_0 \approx T/(T_f + \tau_{max}) \ge N_T$ OFDM vector-valued symbols with each OFDM symbol consisting of $Q = T_f W \ge \lceil W\tau_{max} \rceil + 1$ tones where $T_f < T$ denotes the OFDM symbol duration, the channel model of equation (31) reduces to $$H(f) \approx \sum_{l=0}^{L-1} \tilde{H}(l) e^{-j2\pi \frac{l}{W} f} \quad (37)$$

where the antenna domain matrices $\tilde{H}(\ell)$'s are defined in terms of the beamspace matrices: $\tilde{H}(\ell) \approx A_R H_V(\ell) A_T^H$. The channel frequency response H(f) is characterized by $D_{max} = N_R N_T L$ channel coefficients $\{H_v(i,k,\ell)\}$, out of which only $D \ll D_{max}$ coefficients are assumed to be nonzero. To learn this $D_{max}$-dimensional channel, $M_{tr}$ of $N_0 Q$ OFDM tones may be selected as "pilot tones" to transmit known vector-valued training signals to the receiver over the selected tones. The transmitted and received training signals in this case are related to each other as $$y(n,q) = \sqrt{\frac{\epsilon}{M_{tr}}} H(q) x(n,q) + w(n,q), (n,q) \in P_{tr} \quad (38)$$

where $\epsilon$ is the transmit energy budget available for training, the matrix $H(q) = H(f)|_{f = q/T_f}$, $w(n,q) \sim CN(0_{N_R}, I_{N_R})$, $P_{tr} \subset \{1, \ldots, N_0\} \times \{0, \ldots, Q-1\} : |P_{tr}| = M_{tr}$, and the set of transmit training vectors $x(n,q)$ is designed such that $\Sigma_{P_n} \|x(n,q)\|_2^2 = M_{tr}$.

For an illustrative training signal used in a MIMO channel, let $h_{v,i}{}^T(\ell)$ denote the i-th row of $H_v(\ell)$ and define $H_{v,i} = [h_{v,i}(0) \ldots h_{v,i}(L-1)]$. Further, define $D_i$ to be the number of nonzero virtual coefficients in $$H_{v,i}\left(D_i = \sum_{l=0}^{L-1} \|h_{v,i}(l)\|_0\right)$$

and let the number of pilot tones be $M_{tr} \ge c_9 \cdot \log^5(N_T Q) \max_i D_i$ for some constant $c_9 > 0$. Define the pilot tones $P_{tr}$ to be a set of $M_{tr}$ ordered pairs sampled uniformly at random from $\{1, \ldots, N_T\} \times \{0, \ldots, Q-1\}$, and the corresponding training vectors as $\{x(n,q) = e_n : (n,q) \in P_{tr}\}$. At the receiver, the received signals $\{y(n,q)\}_{P_{tr}}$ are stacked row-wise to yield an $M_{tr} \times N_R$ matrix Y consisting of y(n,q)'s as its rows.

To determine the channel coefficients, define an $M_{tr} \times N_T L$ matrix $U_{tr}$ that is comprised of $\{(u_{f,q}{}^T \otimes a_{T,n}{}^T) : (n,q) \in P_{tr}\}$ as its rows where, $$u_{f,q}^T = \left[e^{-j2\pi \frac{q}{Q} 0} \ldots e^{-j2\pi \frac{q}{Q}(L-1)}\right]$$

and $a_{T,n}{}^T$ denotes the n-th row of $A_T^*$, choose $\lambda = (2\epsilon(1+a)(\log D_{max})/N_T)^{1/2}$ for any $a \ge 0$, define $Y_v = YA_R^*$, and let $y_{v,i}$ denote the i-th column of $Y_v$. The estimate of $H_{v,i}$ is given as follows:

$$\hat{H}_{v,i} = \text{vec}^{-1}(DS(\sqrt{\epsilon/M_{tr}} U_{tr}, y_{v,i}, \lambda)) \quad (39)$$

where DS denotes the Dantzig selector. In a non-sparse environment, the same method can be used to determine the first $\text{const} \cdot M_{tr}/\log^5(N_T Q)$ largest nonzero channel coefficients for $H_{v,i}$ corresponding to an output of each receive antenna. In another illustrative embodiment, a lasso estimator may be used to determine the channel model coefficients.

In another exemplary embodiment, a training signal comprising one OFDM symbol may be used. The described processes can further be applied in a MIMO, doubly selective signal space that employs STF signaling.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Further, for the purposes of this disclosure, "and" or "or" means "and/or". The illustrative embodiments may be implemented as a method, machine, or article of manufacture using standard programming and/or engineering techniques to produce software, firmware, hardware, and/or any combination thereof to control a device to implement the disclosed embodiments.

The foregoing description of illustrative embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device comprising:
   an antenna configured to receive a multipath signal; and
   a processor operably coupled to the antenna to receive the multipath signal, the processor configured to
   determine a training signal transmitted from a second device to create the received multipath signal;
   sample the received multipath signal; and
   determine channel coefficients based on the sampled multipath signal and the determined training signal using a mixed-norm convex optimization process, wherein the channel coefficients characterize a channel associated with the multipath signal.

2. The device of claim 1, wherein the device is the second device.

3. The device of claim 2, wherein the device is a sensor.

4. The device of claim 2, wherein the antenna is further configured to transmit the training signal.

5. The device of claim 1, wherein the antenna is further configured to transmit the determined channel coefficients to the second device.

6. A method of determining channel coefficients characterizing a channel associated with a multipath signal, the method comprising:
   receiving a multipath signal at a first device;
   using a processor at the first device, determining a training signal transmitted from a second device to create the received multipath signal;
   sampling the received multipath signal; and
   determining channel coefficients based on the sampled multipath signal and the determined training signal using a mixed-norm convex optimization process, wherein the channel coefficients characterize a channel associated with the multipath signal.

7. The method of claim 6, further comprising determining a resolution value based on a signaling characteristic of the determined training signal.

8. The method of claim 7, wherein the received multipath signal is sampled uniformly at the determined resolution value.

9. The method of claim 7, wherein the channel coefficients are determined using a discrete approximation of a continuous time channel based on the determined resolution value.

10. The method of claim 6, wherein the mixed-norm convex optimization process comprises a Dantzig selector.

11. The method of claim 10, wherein the mixed-norm convex optimization $$\hat{\beta} = \underset{\tilde{\beta} \in C^P}{\operatorname{argmin}} \|\tilde{\beta}\|_{l_1}$$

subject to $\|X^H r\|_{l_\infty} \leq \lambda$ where $\hat{\beta}$ are the determined channel coefficients, $\|\cdot\|_{l_1}$ is an $l_1$ norm, $\|\cdot\|_{l_\infty}$ is an $l_\infty$ norm, p is a maximum number of channel coefficients, $C^p$ is a p-dimensional complex space, X is a sensing matrix, $r = y - X\hat{\beta}$ is a vector of residuals, y is the sampled multipath signal, and $\lambda$ is a tuning parameter selected to control a number of channel coefficients determined.

12. The method of claim 11, wherein X comprises an $(n+p-1) \times p$ Toeplitz-structured, convolution matrix formed from the training signal, n is $\lceil T_S W \rceil$ where $T_S$ is a signaling duration of the training signal and W is a bandwidth of the training signal.

13. The method of claim 12, wherein the training signal comprises a pseudo-random sequence randomly selected from a zero mean, unit variance distribution.

14. The method of claim 11, wherein X comprises $$X = \begin{bmatrix} u_0 \otimes x_0 & \ldots & u_{\tilde{N}_0-1} \otimes x_{\tilde{N}_0-1} \end{bmatrix}^T$$

where $u_n = [\omega_{N_O}^{Kn} \ \omega_{N_O}^{(K-1)n} \ \ldots \ \omega_{N_O}^{-Kn}]^T$, $\omega_{N_0} = e^{-j\frac{2\pi}{N_O}}$ and $n = 0, 1, \ldots, \tilde{N}_0 - 1, \tilde{N}_0 = N_0 + L - 1, N_0 \approx TW$, T is a packet duration of the training signal, W is a bandwidth of the training signal, $L = \lceil W\tau_{max} \rceil + 1$ $\tau_{max}$ is the delay spread of the channel, $K = \lceil Tv_{max}/2 \rceil$, and $v_{max}$ is a maximum, one-sided Doppler shift caused by the channel.

15. The method of claim 14, wherein the training signal comprises a single-carrier spread spectrum waveform.

16. The method of claim 15, wherein a spreading code, $\{x_n\}$, of the single-carrier spread spectrum waveform is generated from a Rademacher distribution, where the $x_n$'s independently take values of $\sqrt{\epsilon/N_0}$ or $-\sqrt{\epsilon/N_0}$ with probability of 0.5 each where $\epsilon$ is a transmit energy budget for the training signal.

17. The method of claim 6, wherein the sampled multipath signal is formed by projecting the received multipath signal onto a plurality of basis elements.

18. The method of claim 11, wherein the mixed-norm convex optimization process is performed for each receive antenna of a plurality of receive antennas.

19. The method of claim 6, wherein the mixed-norm convex optimization process comprises a Lasso estimator.

20. A non-transitory computer-readable medium having computer-readable instructions stored thereon which, when executed by a processor, cause a device to:
   determine a training signal transmitted from a second device to create a multipath signal received at the device;
   sample the received multipath signal; and
   determine channel coefficients based on the sampled multipath signal and the determined training signal using a mixed-norm convex optimization process, wherein the channel coefficients characterize a channel associated with the multipath signal.

* * * * *

UNITED STATES PATENT AND TRADEMARK OFFICE
CERTIFICATE OF CORRECTION

PATENT NO. : 8,320,489 B2
APPLICATION NO. : 12/390323
DATED : November 27, 2012
INVENTOR(S) : Waheed Uz Zaman Bajwa Page 1 of 1

It is certified that error appears in the above-identified patent and that said Letters Patent is hereby corrected as shown below:

IN THE CLAIMS

Col. 19, Line 56 (Claim 11)

Please delete the phrase "convex optimization" and replace with --convex optimization process solves--

Signed and Sealed this
Fourteenth Day of May, 2013

Teresa Stanek Rea
*Acting Director of the United States Patent and Trademark Office*